US009940040B2

(12) United States Patent
Schnarch et al.

(10) Patent No.: US 9,940,040 B2
(45) Date of Patent: Apr. 10, 2018

(54) SYSTEMS, SOLID-STATE MASS STORAGE DEVICES, AND METHODS FOR HOST-ASSISTED GARBAGE COLLECTION

(71) Applicant: Toshiba Memory Corporation, Minato-ku, Tokyo (JP)

(72) Inventors: Michael Chaim Schnarch, Or-YeHuDa (IL); Obed Iian, Raanana (IL); Yaron Klein, Raanana (IL)

(73) Assignee: Toshiba Memory Corporation, Tokyo (JP)

( * ) Notice: Subject to any disclaimer, the term of this patent is extended or adjusted under 35 U.S.C. 154(b) by 60 days.

(21) Appl. No.: 14/836,107

(22) Filed: Aug. 26, 2015

(65) Prior Publication Data

US 2017/0060448 A1 Mar. 2, 2017

(51) Int. Cl.
*G06F 3/06* (2006.01)
*G06F 12/02* (2006.01)

(52) U.S. Cl.
CPC .......... *G06F 3/0619* (2013.01); *G06F 3/0655* (2013.01); *G06F 3/0688* (2013.01); *G06F 12/0246* (2013.01); *G06F 12/0253* (2013.01); *G06F 2212/7205* (2013.01)

(58) Field of Classification Search
CPC ...... G06F 3/0613; G06F 3/064; G06F 3/0652; G06F 12/0253
See application file for complete search history.

(56) References Cited

U.S. PATENT DOCUMENTS

| 8,037,112 | B2 | 10/2011 | Nath et al. | |
| 9,229,854 | B1* | 1/2016 | Kuzmin | G06F 12/0246 |
| 2013/0007352 | A1* | 1/2013 | Maislos | G06F 12/0246 711/103 |
| 2014/0040532 | A1* | 2/2014 | Watanabe | G06F 13/1668 711/103 |
| 2014/0129758 | A1* | 5/2014 | Okada | G06F 12/0246 711/103 |
| 2014/0365719 | A1 | 12/2014 | Kuzmin et al. | |
| 2015/0032939 | A1* | 1/2015 | Gao | G06F 12/0253 711/103 |

* cited by examiner

*Primary Examiner* — Hal Schnee
(74) *Attorney, Agent, or Firm* — White & Case LLP (57) ABSTRACT

Systems and methods suitable for assisting data storage on a solid-state mass storage device by furthering interaction between a host and the solid-state mass storage device. The method includes providing data in a target block from a solid-state mass storage device to a host computer system, analyzing the data to identify valid and invalid data of the data in the target block with the host computer system, removing the invalid data, reformatting the valid data into a new data structure with the host computer system, writing the new data structure to the mass storage device, and marking the data in the target block as invalid.

25 Claims, 5 Drawing Sheets

SYSTEMS, SOLID-STATE MASS STORAGE DEVICES, AND METHODS FOR HOST-ASSISTED GARBAGE COLLECTION

BACKGROUND OF THE INVENTION

The present invention generally relates to memory media and technologies for use with computers and other processing apparatuses. The invention particularly relates to a solid-state mass storage device using non-volatile, solid-state memory components for permanent storage of data and methods suitable for promoting more efficient storage of data on such devices.

Non-volatile, solid-state memory technologies are widely used in a variety of applications, nonlimiting examples including universal serial bus (USB) drives, digital cameras, mobile phones, smart phones, tablet personal computers (PCs), memory cards, and solid-state drives (SSDs). Non-volatile, solid-state memory technologies used with computers and other processing apparatuses (referred to herein as host computer systems) are currently largely focused on NAND flash memory technologies, with other emerging non-volatile, solid-state memory technologies including phase change memory (PCM), resistive random access memory (RRAM), magnetoresistive random access memory (MRAM), ferromagnetic random access memory (FRAM), organic memories, and nanotechnology based storage media such as carbon nanofiber/nanotube-based substrates. These and other non-volatile, solid-state memory technologies will be collectively referred to herein as solid-state media or solid-state memory components. Mainly for cost reasons, at present the most common solid-state memory components used in SSDs are NAND flash memory components, commonly referred to as flash memory devices, flash memory components, flash-based memory devices, flash-based storage devices, flash-based media, or raw flash. As used herein, the term solid-state mass storage device refers to any device that uses non-volatile, solid-state memory components for permanent storage of data and has means for providing for interaction between a host computer system and the memory components. A nonlimiting example of a solid-state mass storage device as used herein is a solid-state drive having a host interface for communicating with a host computer system, a memory controller, and an array of non-volatile solid-state memory components accessible by the memory controller for storing data of the host computer system therein.

Briefly, flash memory components store information in an array of floating-gate transistors, referred to as memory cells. A memory cell of a NAND flash memory component has a top gate (TG) and a floating gate (FG), the latter being sandwiched between the top gate and the channel of the cell. The floating gate is separated from the channel by a layer of tunnel oxide. Data are stored in (written to or programmed to) a memory cell in the form of a charge on the floating gate which, in turn, defines the channel properties of the memory cell by either augmenting or opposing a charge on the top gate. This charge on the floating gate is achieved by applying a programming voltage to the top gate. Data are erased from a NAND flash cell by applying an erase voltage to the device substrate, which then pulls electrons from the floating gate. The charging (programming) of the floating gate is unidirectional, that is, programming can only inject electrons into the floating gate, but not release them. In general, each of the memory cells may be a single-level cell (SLC) or a multi-level cell (MLC). An SLC is a memory cell that stores one bit of information, and an MLC is a memory cell that stores multiple bits of information.

NAND flash memory cells are typically organized in what are commonly referred to as pages, which in turn are organized in what are referred to as blocks, memory blocks, erase blocks, or sectors. Each block is a predetermined section of the NAND flash memory component that comprises a plurality of pages, and each of the pages comprises a plurality of memory cells. A NAND flash memory component allows data to be stored and retrieved on a page-by-page basis and erased on a block-by-block basis. For example, erasing memory cells involves the application of a positive voltage to the device substrate, which does not allow isolation of individual memory cells or even pages, but must be done on a per block basis. As a result, the minimum erasable size is an entire block, and erasing must be done every time a memory cell is being re-written.

Once a page has been programmed, it may not be programmed again until the whole block in which it resides has been erased. When a flash memory component receives a program command to replace a page of current data with new data, the flash memory component typically stores the new data in a new page having an erased state, and it invalidates the current data in the old page. In other words, the flash memory component does not overwrite the current data at its current page location, but merely invalidates the current data and stores the new data in another page.

As the flash memory component continues to operate, invalid pages tend to accumulate in blocks that have not been recently erased. The accumulation of invalid pages generally reduces the amount of total usable storage space available in the flash memory component, and can also slow down the operation of the flash memory component. Accordingly, so-called garbage collection (GC) operations may be performed on blocks comprising undesirably large numbers of invalid pages in order to reclaim some of the storage space.

A typical garbage collection operation performed on an SSD is undertaken by its flash memory controller and involves moving any remaining valid data from a target block to a different block and then erasing the target block. Garbage collection operations are typically performed automatically by memory controllers as part of memory management performed by an SSD (or other solid-state mass storage device). As a result of the garbage collection operation, incoming commands (read and write) from a host computer system may be stalled, mainly due to the fact that erasure operations on a flash memory component take much longer to complete than read or write operations and no other operation may be started on a flash memory component until the erasure operation is completed. For an SSD, a single flash memory controller may be responsible for managing an array of many flash memory components, accessed via multiple physical memory bus lanes or channels, each channel being functionally coupled to multiple flash memory components. At any time while a garbage collection operation is in progress, individual flash memory components may be inaccessible while erasure operations are in progress and access to whole channels may be blocked while page data transfers are in progress. Therefore, the garbage collection operation, which involves copying valid pages to new locations and block erasure operations, consumes time and resources from the flash memory components and their memory controller, thereby reducing the overall performance of the SSD and hence reducing the Input/Output workload potential of the SSD.

The host computer system can assist the SSD's memory controller by informing the memory controller of non-valid data locations via a Trim command. The Trim command is designed to enable an operating system (OS) to notify the SSD which of the pages no longer contain valid data due to file deletions by the user or the operating system itself. Previously, with hard disk storage media, a file delete operation only resulted in file system sectors being marked as deleted in the sector map or metadata, without the data within the sectors themselves being deleted. With an SSD, a file delete operation results in the pages that these deleted sectors occupy remaining valid until eventually the sectors are overwritten with new data. As such, a garbage collection operation would be less likely to identify the blocks comprising these pages as candidates for consolidation since the pages are not marked as invalid, as they are yet to be overwritten and therefore still valid from the point of view of the SSD's memory controller.

The Trim command was introduced for SSDs to facilitate the early release of these pages into the pool of available space. After a file delete operation, the OS marks the file system sectors as free for new data as done conventionally but also sends a Trim command to the SSD to instruct the flash memory controller to mark the pages occupied by the sectors as not containing valid data. As such, the Trim command allows the SSD to free up valuable space much sooner than simply waiting for data sectors to be eventually overwritten, resulting in less write amplification with fewer writes to the flash memory component, higher write speed, and increased drive life.

Though providing the above-noted benefits, TRIM operations may only be done at a page granularity, in other words, TRIM operations do not address invalid data smaller than the size of a page (sub-page). Applications such as databases (including traditional relational and more recent NoSQL types) often use data objects or structures (hereinafter referred to individually or collectively as data structures) with a small size, e.g. of the order of 10s of bytes, such that a single page typically contains multiple data structures. Over an application's lifetime, data structures are continually being inserted and deleted, causing fragmentation across the storage media. In order to reduce the consumed capacity of data, the application performs a compaction process, removing deleted data and shrinking the actual space via defragmentation. The compaction process is performed irrespective of the storage media type. Notably, the two processes, compaction and garbage collection, are conventionally done individually without any coordination. Furthermore, the small sizes of the data structures prevents the application from informing the SSD regarding invalid data since the sizes are generally smaller than the Trim command granularity, that is, an individual page. Consequently, an SSD that contains data of a database application will contain pages that contain both valid and invalid data structures.

A similar concern was addressed in U.S. Pat. No. 8,037,112 to Nath et al. (Nath). While not intending to promote any particular interpretation, it appears that Nath discloses a process called "semantic compression" in order to prevent log entries from growing indefinitely over time. In semantic compression, log entries having opposite semantics are discarded during compaction. In addition to this compaction process, Nath discloses a log garbage collection component that may be used to reclaim space from dirty log entries. However, it is important to note that these two processes are different from garbage collection processes performed on an SSD. In particular, the semantic compression operates to compress or compact a list of log entries, each of which on their own represent valid entries, but which may be compressed in view of the presence of other entries in the log. The log garbage collection thereafter reclaims spaces from the compressed log entries. In contrast, garbage collection is performed on an SSD in order to remove invalid data from pages and thereby provide additional storage space. Although Nath mentions conventional garbage collection, it discloses that the garbage collection and log garbage collection processes are different processes performed by different components. As such, Nath's semantic compression and conventional garbage collection are entirely independent processes.

U.S. Patent Application Publication No. 2014/0365719 to Kuzmin et al. (Kuzmin) discloses a process of host-controller cooperation in managing NAND flash memory. While not intending to promote any particular interpretation, it appears that Kuzmin discloses a controller that maintains information for each erase unit which tracks memory usage. This information assists the host in making decisions about specific operations, for example, initiating garbage collection, space reclamation, wear leveling, or other operations. By redefining host-controller responsibilities in this manner, much of the overhead association with flash translation layer (FTL) functions can be substantially removed from the memory controller. However, while not intending to promote a particular interpretation, it appears that the host simply manages and schedules garbage collection within the storage device, but does not take an active role in identifying invalid data. Further, the issue of data structures that are smaller than the size of a page was not addressed by Kuzmin, that is, the host is not disclosed as analyzing data in a page and identifying sub-page data that is invalid.

In view of the above, it can be appreciated that there are certain problems, shortcomings or disadvantages associated with the prior art, and that it would be desirable if a system and method were available that allows for interaction between host computer systems and solid-state mass storage devices to improve garbage collection processes in the solid-state mass storage devices, particularly in terms of the ability to perform a garbage collection routine capable of addressing data structures smaller than the size of a page.

BRIEF DESCRIPTION OF THE INVENTION

The present invention provides systems and methods suitable for promoting more efficient data storage on a solid-state memory component by providing a level of interaction between a solid-state mass storage device and a host computer system that is capable of addressing invalid data at a sub-page level.

According to one aspect of the invention, a solid-state mass storage device is provided that is configured for use with a host computer system and for storing data thereof. The mass storage device includes a host interface for communicating with the host computer system and at least one non-volatile solid-state memory component for storing the data. The at least one non-volatile solid-state memory component is organized into a plurality of blocks each comprising a plurality of pages. The mass storage device includes a memory controller configured to receive and send communications to the host computer system through the host interface and interface with the at least one non-volatile solid-state memory component. The memory controller is configured to determine validity of data within the pages of the at least one non-volatile solid-state memory component and identify a target block of the blocks as being available for garbage collection. The target block comprises both valid and invalid data pages as determined by the memory controller. The solid-state mass storage device is configured for performing a host-assisted garbage collection operation with assistance from the host computer system. The memory controller is configured to provide the valid data pages of the target block from the mass storage device to the host computer system during the host-assisted garbage collection operation. The memory controller is configured to receive a new data structure from the host computer system in response to providing the valid data pages. The new data structure includes only data structures determined to be valid by the host computer system. Upon receiving the new data structure from the host computer system, the memory controller writes the new data structure to the at least one non-volatile solid-state memory component of the solid-state mass storage device. Thereafter, metadata of the new data structure is updated and the valid data pages of the target block are invalidated.

According to another aspect of the invention, a system is provided that includes a host computer system, a solid-state drive for storing data of the host computer system, and an interface providing for communication between the solid-state drive and the host computer system. The solid-state drive includes at least one non-volatile solid-state memory component organized into blocks, each of the blocks organized into pages. The host computer system and the solid-state drive are configured to jointly perform a host-assisted garbage collection operation by communicating through the interface. During the host-assisted garbage collection operation, the solid-state drive determines the validity of data pages within the blocks and identifies a target block of the blocks as being available for garbage collection. The target block includes both valid and invalid data pages as determined by the solid-state drive. The solid-state drive provides the valid data pages of the target block from the solid-state drive to the host computer system. Upon receiving the valid data pages, the host computer system identifies and removes invalid data structures within the valid data pages provided by the solid-state drive, and organizes remaining valid data within the valid data pages received from the solid-state drive into a new data structure, and writes the new data structure to the at least one non-volatile solid-state memory component of the solid-state drive. Thereafter, metadata of the new data structure is updated and the valid data pages of the target block are invalidated.

According to another aspect of the invention, a method is provided that includes providing data in a target block from a solid-state mass storage device to a host computer system, analyzing the data to identify valid and invalid data of the data in the target block with the host computer system, discarding any invalid data and reformatting the valid data into a new data structure with the host computer system, writing the new data structure to the mass storage device, and marking the data in the target block as invalid.

Technical effects of the systems, solid-state mass storage devices, and methods described above preferably include the ability to assist and improve the efficiency of garbage collection operations performed on data stored in a solid-state mass storage device. In particular, it is believed that by utilizing a host computer system to analyze valid data pages of a target block of the mass storage device, organize data structures within the pages of the target block that are found to be valid, and then re-writing the valid data structures to new, wholly valid pages in the mass storage device, garbage collection may be assisted by reducing write amplification, increasing performance, and improving endurance of the mass storage device. According to certain embodiments of the invention, the host computer system is capable of analyzing, removing, organizing, and writing data structures within the valid data pages that are smaller than the total capacity of the page in which they reside, i.e., sub-page data. Consequently, valid data pages having invalid data structures therein may undergo garbage collection even if the mass storage device is not aware of the invalid data structures. As such, the system can free up storage space in the mass storage device that would otherwise remain unusable under a conventional page based garbage collection system.

Other aspects and advantages of this invention will be better appreciated from the following detailed description.

DETAILED DESCRIPTION OF THE INVENTION

The present invention generally relates to host computer systems that perform application data compaction operations, solid-state mass storage devices that perform garbage collection operations, and interactions between such host computer systems and mass storage devices. In particular, certain aspects of the invention provide for promoting synergies between application data compaction and garbage collection operations. According to a preferred embodiment of the invention, a host computer system and a solid-state mass storage device interact to assist with data storage on the mass storage device by combining the previously separate tasks of application data compaction and garbage collection operations into a single cooperative operation. Although embodiments of the invention discussed below are described in reference to non-volatile, solid-state NAND flash memory components, it is within the scope of the invention that aspects described herein may be applicable to other memory components which perform or utilize garbage collection operations, and therefore the invention is not limited to any one type of host computer system, host application, or data storage media.

Figure 1:
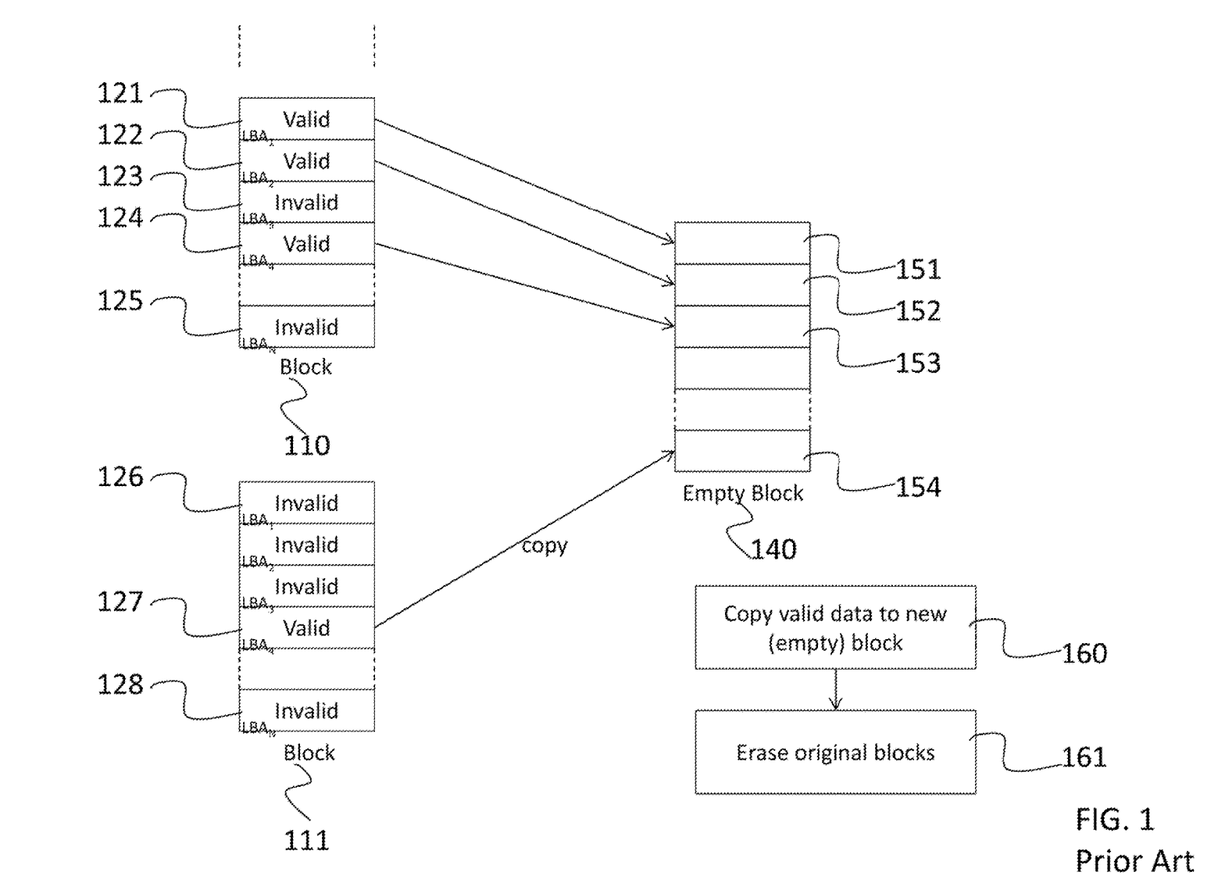
FIG. 1 is a schematic representation of a garbage collection operation performed in a non-volatile memory as conventional in the art.

FIG. 1 represents a conventional garbage collection operation within a solid-state mass storage device, for example, a solid-state drive (SSD). As conventional in the art, the mass storage device includes an array of non-volatile, solid-state memory components organized into a plurality of blocks (of which blocks 110, 111 and 140 are represented), each block further organized into pages associated with Logical Block Addresses (LBAs). A populated block 110 is represented as including both valid and invalid data in its pages 121-125. For example, pages 121, 122, and 124 contain valid data while pages 123 and 125 contain invalid data. In order to reuse the block 110, valid data pages 121, 122, and 124 are copied into an empty block 140, specifically, into its pages 151, 152, and 153. The device mapping information, that is, metadata, is updated with the new locations of the valid pages 151, 152, and 153, and the pages 121, 122, and 124 can be marked as invalid (not shown). If all of the pages in the block 110 are marked as invalid, the entire block 110 may be erased and subsequently reused. Notably, a page cannot be marked as invalid if it contains any valid data, including sub-page data.

Following this operation, another block 111 is processed, with valid page 127 copied to page 154 of the block 140. Again, page 127 is marked invalid and, if all pages in block 111 are invalid, the whole block 111 may be erased. This operation is continuously repeated with other blocks (not shown) consisting of valid and invalid data pages in order to continuously provide free space for programming in the mass storage device. A block being processed by the garbage collection operation will be referred to herein as a target block, and the next block scheduled to be subsequently processed will be referred to herein as a next target block. Target blocks are selected and scheduled for garbage collection according to various criteria. The criteria may include a valid data ratio (that is, the ratio of the number of valid pages in the block relative to the total number of pages in the block), an endurance level of the blocks (that is, the number of Program/Erase cycles that the block has been subjected to for wear-leveling), or any other suitable criteria.

Figure 2:
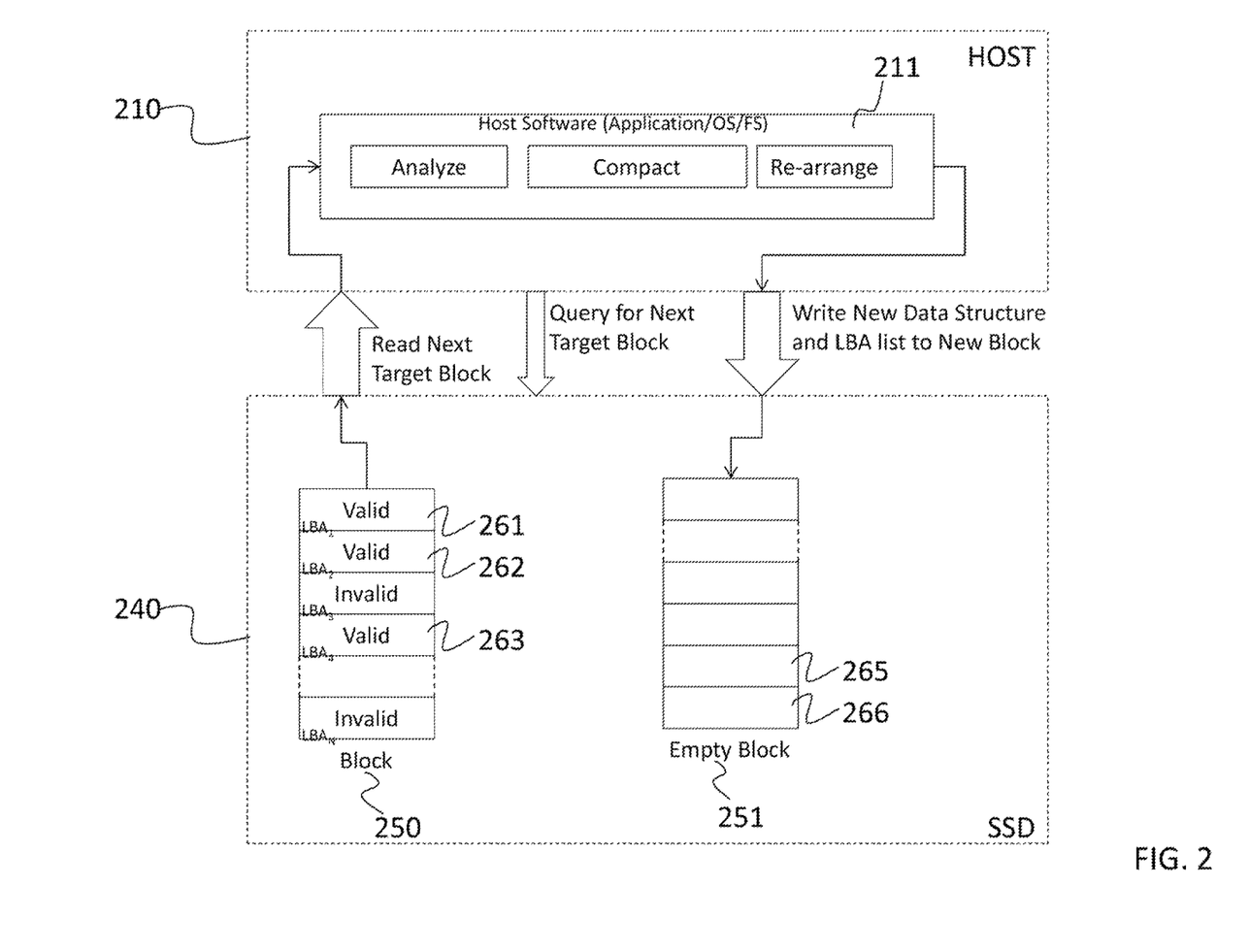
FIG. 2 is a schematic representation of a garbage collection operation involving host assistance in accordance with an aspect of the present invention.

FIG. 2 represents a host-assisted garbage collection operation in accordance with certain aspects of the invention. As represented, a host computer system (host) 210 is connected to a solid-state mass storage device, in this example, an SSD 240. The host 210 queries the SSD 240 for Logical Block Addresses (LBA) of the next target block 250 for garbage collection and the valid data pages therein. The SSD 240 sends the valid data pages 261, 262, and 263 of the next target block 250 to the host 210. Although not preferred, it is foreseeable that all data in the block 250, including invalid data pages, could be sent to the host 210. The host software 211, for example, an operating system (OS), a File System (FS), or an application running on the host 210, analyzes the valid data pages 261, 262, and 263 provided by the SSD 240.

This analysis includes determining whether any sub-page data (that is, individual data structures or objects) within each valid data page 261, 262, and 263 are still required by an application running on the host 210, such as but not limited to a database, and how those required data structures may be compacted (or de-fragmented). Although the SSD 240 marked all of the provided valid data pages 261, 262, and 263 as valid, it is foreseeable that some or all of the individual pages may no longer be needed by the application as a result of data structures therein containing invalid data detected by the host software 211. In the example represented in FIG. 2, at least some data structures (not shown) in the valid data pages 261, 262, and 263 were determined to be invalid by the host software 211. Therefore, following this analysis, the host software 211 prepares a new data structure containing only the required valid data structures, and an LBA list to be sent to the SSD 240. The SSD 240 receives the new data structure and writes it to pages 265 and 266 of a new (empty) block 251. Since data structures determined to be invalid during the analysis were discarded, the three valid data pages 261, 262, and 263 are able to be compacted to fit in only two new pages 265 and 266. The valid pages 261, 262, and 263 of the block 250 are marked as invalid and, if desired, the whole block 250 may be erased.

According to an aspect of one embodiment of the invention, after the host 210 analyzes the valid data pages 261, 262, and 263 but before it sends the valid data structures to the SSD 240, the sub-page data (i.e., data structures that are smaller than the size of a page) are compacted by the host 210 to a new format and then sent back to the SSD 240. That is, unlike a mass storage device (for example, an SSD) that can only mark whole pages as valid or invalid, the host software 211 can analyze individual data structures to determine if they are still actually valid, and then compact these portions of the data into new data structures. The SSD 240 may include an extended interface allowing the host 210 to read the next target block in the SSD 240 for garbage collection and an extended interface allowing the host 210 to write to the SSD 240 the actual (valid) data to be maintained in the SSD 240.

According to another aspect of the invention, the compacted data of the new data structure can be written to the SSD 240 in a simple Write command, hence the metadata maintained by the flash translation layer (FTL) will be automatically updated according to the normal operation of the SSD 240. According to an optional aspect of the invention, the data compacted by the host software 211 can be written within a new application programming interface (API) transferring the valid data structures to the drive using DMA (Direct Memory Access) transfers with a Scatter Gather List (SGL) containing the locations and lengths of the valid data structures. This will avoid the copying of valid data structures to new pages and may reduce the number of 10 transfers to the drive when compared with simple Write commands.

According to another optional aspect of the invention, the host 210 may initiate the host-assisted garbage collection operation by requesting the next target block 250 while the SSD 240 acts as a slave. In addition, if a garbage collection operation is triggered by an internal memory controller mechanism, for example, by detecting that the number of free pages in a block is less than a threshold, the block may be processed internally by the SSD 240 and not wait for host assistance. As such, the SSD 240 can be configured for both host-assisted garbage collection and internal (unassisted) garbage collection operations. Alternatively, or in addition to the above, an internal memory controller mechanism may, rather than triggering an internal garbage collection operation, cause a notification to be sent to the host 210 regarding the availability of a block for garbage collection by the host software 211. The host 210 can then act on this notification by reading the next target block 250 and processing it according to the host-assisted garage collection operation.

It is within the scope of the invention that the SSD 240 could determine whether it would be desirable to notify the host 210 for a particular target block. For example, a memory controller of the SSD 240 may include a mechanism whereby the memory controller is configured to parse, analyze, and/or record semantic content of the data being stored in the SSD 240. By direct examination and parsing of the data stored therein, the memory controller may determine how the SSD 240 is partitioned into logical drives, what type of file systems have been used to format the logical drives, and the hierarchy and identity of the files and associated metadata which have been written to those file systems. This information could enable the memory controller to determine if data previously stored was rendered invalid, independently of the host 210. For example, if files were deleted, logical drive partitions resized or deleted etc., then the memory controller could mark the data pages associated with those changes. Alternatively, the memory controller could identify, on the basis of the knowledge of the files being read or written to, which files were associated with database applications and therefore determine that the data pages associated with those files are more likely to contain sub-page data structures that could benefit from host assistance for garbage collection and notify the host 210 accordingly to request garbage collection assistance.

Figure 3:
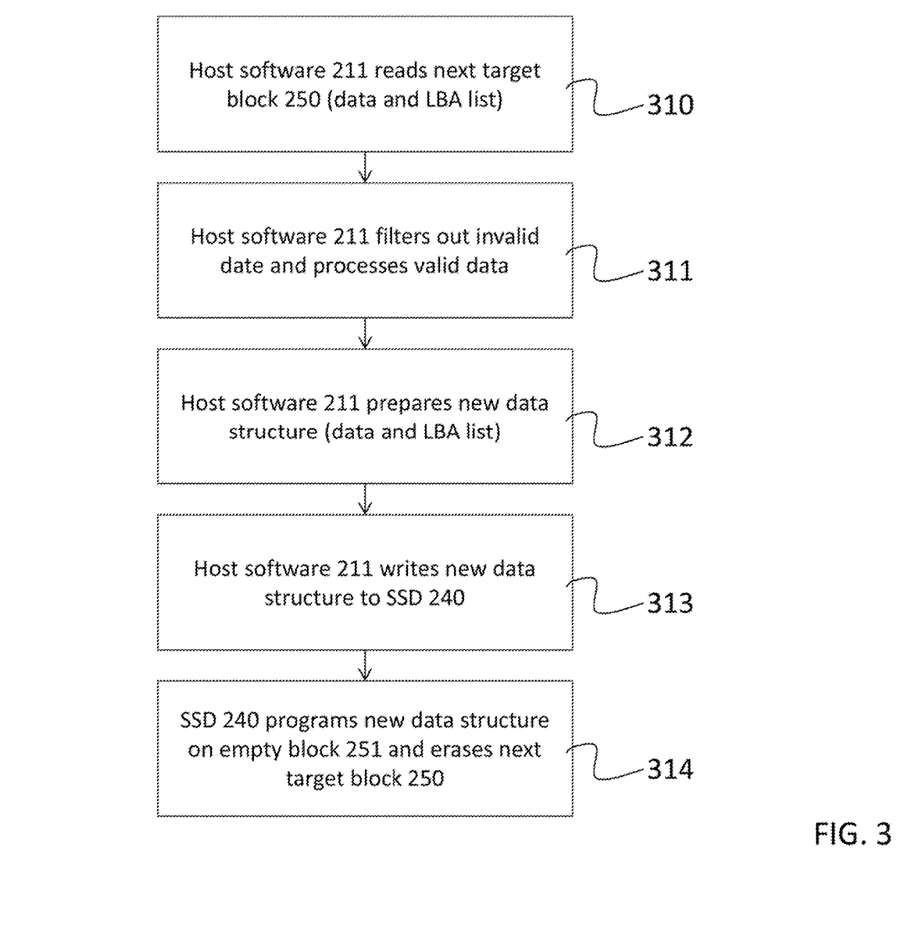
FIG. 3 is a flow chart representing exemplary steps of a host assisting in a garbage collection operation in accordance with an aspect of the present invention.

FIG. 3 represents a compaction process of a type described for FIG. 2, in which the host software 211 initially reads 310 the next target block 250. The data within the target block 250 that is marked as valid by the memory controller of the SSD 240 may contain individual data structures or objects which are invalid although their invalid status may only be known by the host 210 and not the memory controller. The host software 211 (for example, OS, FS, or an application) filters out non-valid data (that is, data which appear to the memory controller of the SSD 240 to be still valid, but is recognized by the host software 211 as no longer valid) and then processes 311 and prepares 312 a new consecutive data segment defining a new data structure comprising only the data (and a new LBA data list) identified as valid by the host software 211. According to an aspect of the invention, this filtering can be part of the host software's compaction process. That is, the host-assisted garbage collection operation is a combination of an application compaction process within the host 210 and the garbage collection process conventionally performed in the SSD 240. When the host 210 is done with the compaction process (steps 310-312), the host 210 writes 313 the new data structure back to the SSD 240, for example, by sending a write command to the SSD 240. In response, the SSD 240 writes/appends (programs 314) the incoming data to a new block 251 and invalidates and/or erases the old block 250. Preferably, by compacting and de-fragmenting the data, the write amplification of the SSD 240 is minimized, thereby increasing the longevity and endurance of the SSD 240 while simultaneously increasing its performance.

According to another aspect of the invention, the host-assisted garbage collection operation is believed to have a minimal impact on internal operations of the SSD 240 as the next target block is read only once and written once, the same as the internal (that is, without assistance) garbage collection operation. Any additional overhead will likely result from the data pages and LBA list being sent from the SSD 240 to the host 210 and the new data pages and LBA list being returned from the host 210 to the SSD 240.

Figure 4:
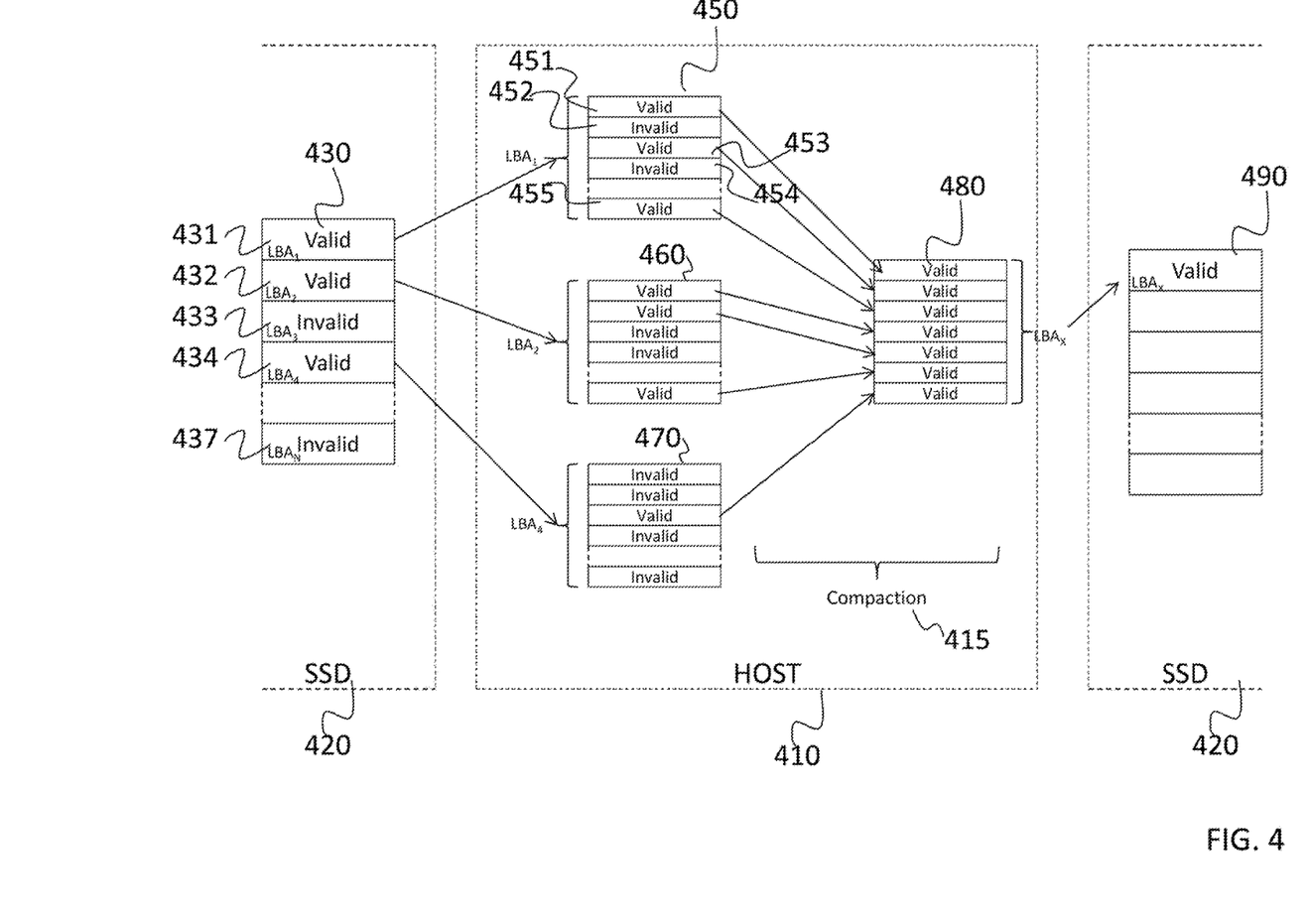
FIG. 4 is a schematic representation of a host compaction operation in accordance with an aspect of the present invention.

FIG. 4 illustrates a host-assisted garbage collection process in a typical example wherein data structures smaller than the size of a page are consolidated on an SSD 420. A block 430 of the SSD 420 that contains valid pages 431, 432, and 434 and invalid pages 433 and 437 is targeted for garbage collection. The valid pages 431, 432, and 434 are read into a buffer in a memory controller of the SSD 420 and then transferred to a host 410. In this example, the page 431 with LBA1 is transferred to the host 410 as a page 450 containing multiple data structures, and is examined for its software valid information as determined by the host application. The data structures 451, 453, and 455 within the page 450 are determined as still valid by the host application, while the data structures 452 and 454 are determined to be invalid. Accordingly, the data structures 451, 453 and 455 are aggregated with other valid data structures from blocks 460 and 470 (which were similarly processed) and compacted 415 into a new data page 480 and assigned to $LBA_x$. The new page 480 is returned to the SSD 420 and placed in a new block 490.

Figure 5:
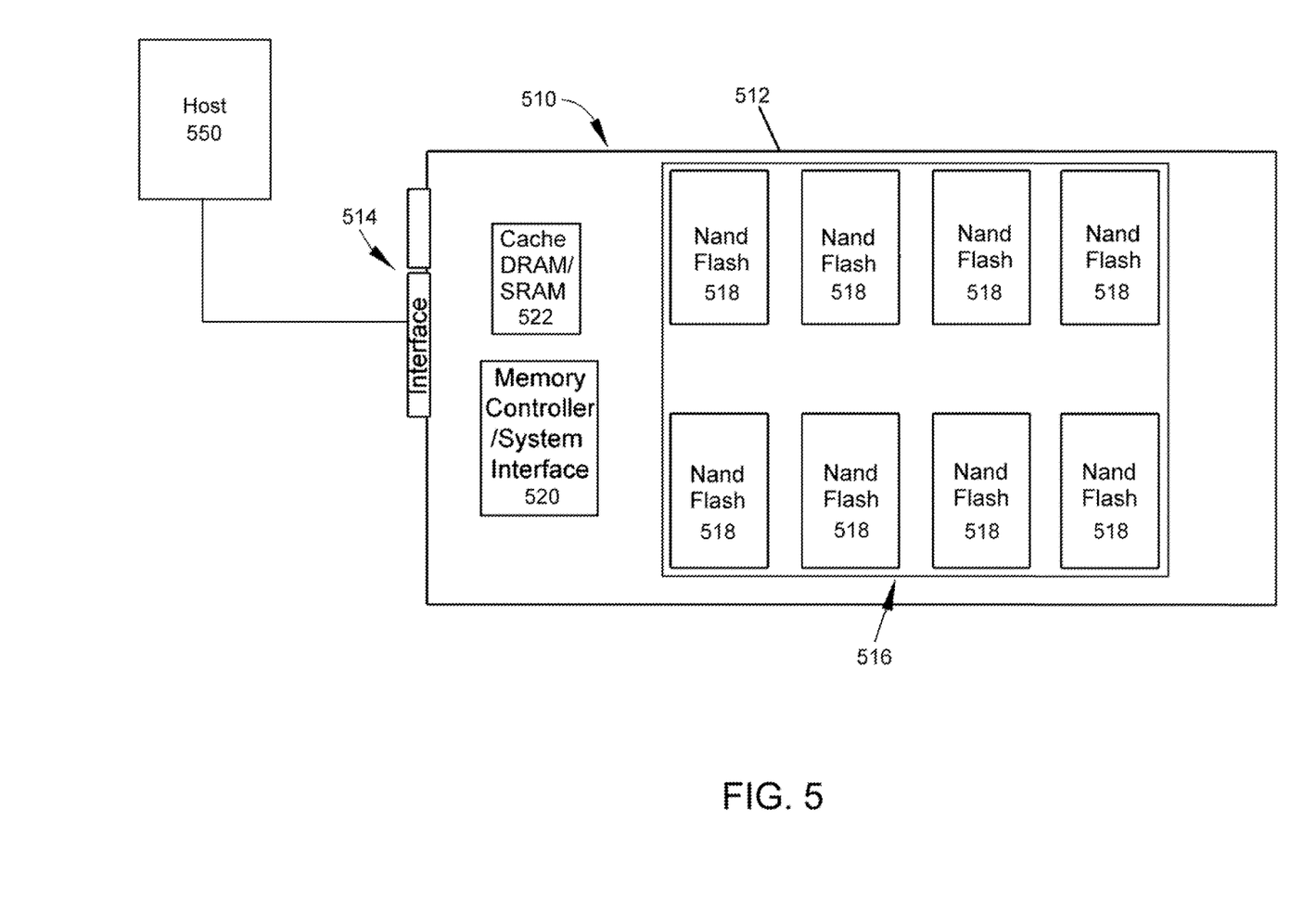
FIG. 5 is a schematic representation of a non-volatile, solid-state drive in accordance with an aspect of the present invention.

FIG. 5 is schematically representative of an exemplary SSD 510 containing an array 516 of non-volatile, solid-state memory components (NAND flash memory components 518). The SSD 510 is suitable for performing both host-assisted garbage collection and internal garbage collection operations of this invention. The SSD 510 is represented as being configured as an internal solid-state mass storage device for a computer or other host 550 equipped with a data and control bus for interfacing with the SSD 510. The bus may operate with any suitable protocol in the art, preferred examples being the advanced technology attachment (ATA) bus in its parallel or serial iterations, fiber channel (FC), small computer system interface (SCSI), and serially attached SCSI (SAS).

As known in the art, the SSD 510 is adapted to be accessed by the host 550 with which it is interfaced. In FIG. 5, this interface is through a connector (host) interface 514 of the SSD 510 carried on a drive package that includes a printed circuit board 512. Access is initiated by the host 550 for the purpose of storing (writing) data to and retrieving (reading) data from the array 516 of memory components 518, each of the memory components 518 being an integrated circuit (IC) chip carried on the circuit board 512. The memory components 518 are preferably accessed in parallel by a memory controller/system interface (controller) 520, through which data pass when being written to and read from the memory components 518. Protocol signals received through the interface 514 are translated by an abstraction layer of the controller 520 from logical to physical addresses on the memory components 518 to which the data are written or from which they are read. The controller 520 also addresses a volatile memory cache chip 522 integrated on the SSD 510. The cache chip 522 may be, for example, DRAM or SRAM-based, as known in the art. Alternatively, the cache memory of the SSD 510 may be integrated on the controller 520, as also known in the art.

The SSD 510 is configured to coordinate with the host 550 to jointly perform a host-assisted garbage collection operation as described previously. The memory controller 520 provides valid data pages of a target block from the SSD 510 to the host 550 during a host-assisted garbage collection operation. The host 550 may analyze and reformat valid data within the valid data pages and return a new data structure comprising the valid data to the SSD 510. Upon receiving the new data structure from the host 550, the memory controller 520 is configured to write the new data structure to a block in one or more of the memory components 518, update metadata of the new data structure, and invalidate the valid data pages of the target block.

In addition, the SSD 510 is preferably configured to perform an internal garbage collection operation without assistance from the host 550. This internal garbage collection operation may include copying valid data pages from a target block that contains both valid and invalid data pages to a second block, updating metadata associated with the valid data in the second block, and then invalidating the valid data pages in the first block. Preferably, the memory controller 522 is configured to determine if an individual block that is available for garbage collection will be processed with the host-assisted garbage collection operation or with the internal garbage collection operation. If the host-assisted garbage collection operation is preferred for a given target block, the memory controller 520 may be configured to notify the host 550 that the target block is available for processing, and/or configured to receive a request from the host 550 to initiate the host-assisted garbage collection operation on the next target block.

In view of the above, it is clear that embodiments in accordance with various aspects of the invention may provide several benefits relative to conventional unassisted garbage collection processes. By having the compaction, defragmentation, or re-arranging performed by host software rather than the memory controller of the SSD, the effectiveness of a garbage collection process may be promoted, improving overall device performance, reducing write amplification, and lengthening the overall useful life span of the SSD. In addition, the host software preferably is capable of analyzing and re-organizing data structures that are smaller than the size of a page, unlike conventional SSDs which are limited to page based determinations. Consequently, pages within the SSD that comprise both valid and invalid data structures may be processed and reused, rather than the SSD being forced to wait for all data structures in the page to become invalid prior to performing garbage collection on the page.

While the invention has been described in terms of specific embodiments, it is apparent that other forms could be adopted by one skilled in the art. For example, the physical configurations of a host and non-volatile, solid-state mass storage device (for example, an SSD) could differ from those shown, and processes/methods other than those noted could be used. Therefore, the scope of the invention is to be limited only by the following claims.

The invention claimed is:

1. A solid-state mass storage device configured for use with a host computer system and for storing data thereof, the solid-state mass storage device comprising:
    at least one non-volatile solid-state memory organized into a plurality of blocks each comprising a plurality of pages for storing data;
    a memory controller communicatively coupled to the at least one non-volatile solid-state memory and configured to identify as valid one or more pages containing the data; and
    a host interface communicatively coupled to the memory controller and configured to communicate with the host computer system regarding application data required by an application running on the host computer system and to perform a host-assisted garbage collection operation, wherein
    the host interface is configured to receive from the host computer system results of the host-assisted garbage collection operation identifying as invalid sub-page application data no longer required by the application, the invalid sub-page application data contained in the one or more pages which the memory controller identified as valid based on information received from the host computer system concerning the application.

2. The solid-state mass storage device of claim 1, wherein the memory controller is configured to receive and process a request from the host computer system to initiate the host-assisted garbage collection operation.

3. The solid-state mass storage device of claim 1, wherein the memory controller is configured to perform an internal garbage collection operation in the solid-state mass storage device without assistance from the host computer system, the internal garbage collection operation comprising copying valid data pages from a first of the blocks that contains both valid and invalid data pages to a second of the blocks and invalidating the valid data pages in the first block.

4. The solid-state mass storage device of claim 3, wherein the memory controller is configured to determine if an individual block of the blocks that is available for garbage collection will be processed with the host-assisted garbage collection operation or with the internal garbage collection operation.

5. The solid-state mass storage device of claim 4, wherein the memory controller is configured to analyze semantic content of the data stored in the at least one non-volatile solid-state memory component, the determination by the memory controller of whether an individual block will be processed with the host assisted garbage collection being based upon the semantic content of the data stored in the individual block.

6. The solid-state mass storage device of claim 1, wherein the memory controller is configured to notify the host computer system that a target block is available for processing with the host-assisted garbage collection operation, the target block comprising both valid and invalid data pages.

7. The solid-state mass storage device of claim 1, wherein the host interface is further configured to receive instructions from the host computer system to remove the identified invalid sub-page application data from the one or more pages to form a new data structure.

8. A system comprising:
    a host computer system including an application running on the host computer system;
    a solid-state drive for storing data of the host computer system, the solid-state drive comprising at least one non-volatile solid-state memory component organized into blocks, each of the blocks organized into pages containing data; and
    an interface providing for communication between the solid-state drive and the host computer system, the interface configured to communicate with the host computer system regarding application data required by the application;
    wherein the host computer system and the solid-state drive are configured to jointly perform a host-assisted garbage collection operation by communicating through the interface, wherein during the host-assisted garbage collection operation the solid-state drive identifies as valid one or more pages containing data, and provides the valid pages to the host computer system; and
    wherein upon receiving the valid data pages the host computer system identifies as invalid sub-page application data no longer required by the application within the valid data pages provided by the solid-state drive based on information regarding the application.

9. The system of claim 8, wherein the host computer system requests the valid data pages in a target block identified as ready for garbage collection from the solid-state drive.

10. The system of claim 8, wherein the solid-state drive is configured to perform an internal garbage collection operation in the solid-state drive without assistance from the host computer system, the internal garbage collection operation comprising copying valid data pages from a first of the blocks that contains both the valid and invalid data pages to a second of the blocks, and invalidating the valid data pages in the first block.

11. The system of claim 10, wherein the solid-state drive is configured to determine if an individual block of the blocks that is available for garbage collection should be processed with the host-assisted garbage collection operation or with the internal garbage collection operation.

12. The system of claim 11, wherein the solid-state drive is configured to analyze semantic content of the data stored in the at least one non-volatile solid-state memory component, the determination by the solid-state drive of whether an individual block will be processed with the host assisted garbage collection being based upon the semantic content of the data stored in the individual block.

13. The system of claim 8, wherein the solid-state drive notifies the host computer system of an availability of a target block for processing with the host-assisted garbage collection operation, the target block comprising both valid and invalid data pages.

14. The system of claim 8, wherein at least one of the valid data pages comprises more than one data structure each having a size that is smaller than a total storage space of the at least one valid data page.

15. The system of claim 8, wherein the valid data pages are analyzed by the host computer system to determine which data structures in the valid data pages are valid according to the requirements of an application on the host computer system.

16. The system of claim 8, wherein the host computer system organizes the valid data as part of a compaction operation performed on the host computer system.

17. The system of claim 8, wherein the host computer system is further configured to remove the invalid sub-page application data from the valid data pages to form a new data structure.

18. A method comprising:
  providing data in a target block from a solid-state mass storage device to a host computer system;
  analyzing, with the host computer system, the data to identify invalid sub-page application data of the data in the target block no longer required by an application running on the host computer system, based on information concerning the application;
  removing the invalid sub-page application data;
  after removing the invalid sub-page application data no longer required by the application, reformatting remaining sub-page data, which comprise valid data, into a new data structure with the host computer system;
  writing the new data structure to the solid-state mass storage device; and
  marking the data in the target block as invalid.

19. The method of claim 18, further comprising requesting the data in the target block with the host computer system.

20. The method of claim 18, further comprising performing a garbage collection operation in the solid-state mass storage device without assistance from the host computer system, the garbage collection operation comprising copying valid data pages from a first of the blocks that contains both valid and invalid data pages to a second of the blocks, updating metadata of the second block, and then invalidating the valid data pages in the first block.

21. The method of claim 20, further comprising determining with the solid-state mass storage device if an individual block of the blocks that is available for garbage collection will be processed with assistance by the host computer system or by the solid-state mass storage device without assistance by the host computer system.

22. The method of claim 21, further comprising analyzing semantic content of the data stored in the at least one non-volatile solid-state memory component with the solid-state mass storage device, wherein determining if an individual block will be processed with assistance by the host computer system is based upon the semantic content of the data stored in the individual block.

23. The method of claim 18, further comprising notifying with the solid-state mass storage device the host computer system of an availability of the target block for garbage collection by the host computer system.

24. The method of claim 18, wherein analyzing the data to identify valid data includes identifying at least one valid data structure within at least one of the valid data pages, the at least one valid data structure having a size that is smaller than a total storage space of the at least one valid data page.

25. The method of claim 18, wherein analyzing the data to identify invalid sub-page application data includes determining which data structures in the valid data pages are valid according to requirements of an application on the host computer system, the valid data being those of the data structures that are determined to be required by the application.

* * * * *

UNITED STATES PATENT AND TRADEMARK OFFICE
CERTIFICATE OF CORRECTION

PATENT NO. : 9,940,040 B2
APPLICATION NO. : 14/836107
DATED : April 10, 2018
INVENTOR(S) : Michael Chaim Schnarch et al.

It is certified that error appears in the above-identified patent and that said Letters Patent is hereby corrected as shown below:

On the Title Page

Item (72), Under Inventors:
Correct the spelling of the second inventor's name:
Obed Iian, Raanana (IL) should read --Oded Ilan, Raanana (IL)--.

Signed and Sealed this
Fifth Day of June, 2018

Andrei Iancu
*Director of the United States Patent and Trademark Office*